United States Patent
Takahashi et al.

(10) Patent No.: US 9,532,547 B2
(45) Date of Patent: Jan. 3, 2017

(54) ABSORBENT SHEET FOR PETS

(71) Applicant: Uni-Charm Corporation, Ehime (JP)

(72) Inventors: Yumei Takahashi, Kagawa (JP); Yasuhiro Sasano, Kagawa (JP)

(73) Assignee: Unicharm Corporation, Ehime (JP)

( * ) Notice: Subject to any disclaimer, the term of this patent is extended or adjusted under 35 U.S.C. 154(b) by 0 days.

(21) Appl. No.: 14/652,238

(22) PCT Filed: Dec. 6, 2013

(86) PCT No.: PCT/JP2013/082892
§ 371 (c)(1),
(2) Date: Jun. 15, 2015

(87) PCT Pub. No.: WO2014/092030
PCT Pub. Date: Jun. 19, 2014

(65) Prior Publication Data
US 2015/0334985 A1 Nov. 26, 2015

(30) Foreign Application Priority Data
Dec. 13, 2012 (JP) ................. 2012-272391

(51) Int. Cl.
A01K 29/00 (2006.01)
A01K 23/00 (2006.01)
(Continued)

(52) U.S. Cl.
CPC ........... *A01K 1/0157* (2013.01); *A01K 1/0107* (2013.01)

(58) Field of Classification Search
CPC .............................. A01K 1/0107; A01K 1/0157
(Continued)

(56) References Cited

U.S. PATENT DOCUMENTS 3,626,899 A * 12/1971 Spellman ............... A01K 15/02
119/169
6,244,216 B1 * 6/2001 Ochi .................... A01K 1/0107
119/169
(Continued)

FOREIGN PATENT DOCUMENTS

JP 11018603 A 1/1999
JP 3548384 4/2004
(Continued)

OTHER PUBLICATIONS

International Search Report from corresponding PCT application No. PCT/JP2013/082982 dated Jan. 28, 2014 (4 pgs).
(Continued)

Primary Examiner — Marc Burgess
(74) Attorney, Agent, or Firm — Brinks Gilson & Lione

(57) ABSTRACT

An absorbent sheet for pets which has a strong pet-excrement concealing effect, and makes it possible to recognize the time for an exchange of the pet sheet. The absorbent sheet has an excrement surface, a placement surface, a body-outer-edge section, an outside direction, an inside direction, an absorbent, an absorbent-outer-edge section, an absorbent-outer-edge region which is a region containing the absorbent-outer-edge section, an absorbent-center region formed in the inside direction in relation to the absorbent-outer-edge region, and a color-scheme region which is recognizable from the excrement-surface side. The color-scheme region has a first color-scheme region, a second color-scheme region and a third color-scheme region, and forms a color-scheme pattern from the first color-scheme region, the second color-scheme region and the third color-scheme region.

14 Claims, 11 Drawing Sheets

(51) Int. Cl.
*A01K 1/015* (2006.01)
*A01K 1/01* (2006.01)

(58) Field of Classification Search
USPC .................................. 119/171–173, 161, 169
See application file for complete search history.

(56) References Cited

U.S. PATENT DOCUMENTS

| | | | | |
|---|---|---|---|---|
| 8,042,490 | B2* | 10/2011 | Takahashi | A01K 1/0157 119/169 |
| 8,578,888 | B2* | 11/2013 | Komatsubara | A01K 1/0107 119/171 |
| 2005/0166855 | A1* | 8/2005 | Kaneko | A01K 1/0107 119/169 |
| 2005/0166856 | A1 | 8/2005 | Kaneko et al. | |
| 2008/0236504 | A1* | 10/2008 | Silverman | A01K 1/0107 119/169 |
| 2009/0000561 | A1* | 1/2009 | Takahashi | A01K 1/0107 119/171 |
| 2009/0048571 | A1* | 2/2009 | Catalan | A61L 15/22 119/171 |

FOREIGN PATENT DOCUMENTS

| | | |
|---|---|---|
| JP | 2011-177167 A | 9/2011 |
| JP | 2012-130285 A | 7/2012 |
| JP | 2012-130286 A | 7/2012 |

OTHER PUBLICATIONS

Chinese Office Action and English translation of text portion from corresponding Chinese application No. 201380065188.1 dated Apr. 28, 2016 (11 pgs).
International Preliminary Report on Patentability and Written Opinion from corresponding PCT application /No. PCT/JP2013/082892 dated Jun. 16, 2015 (9 pgs).
Japanese Office Action and English translation from corresponding Japanese application No. 2012-272391 dated Jan. 22, 2014 (5 pgs).
Australian Examination Report No. 1 from corresponding Australian application No. 2013358136 dated Jan. 18, 2016 (2 pgs).
European extended Search Report from corresponding European application No. 13862663.5 dated Sep. 16, 2016 (7 pgs).

* cited by examiner

ABSORBENT SHEET FOR PETS

RELATED APPLICATIONS

This application is a 35 U.S.C. §371 national phase filing of International Patent Application No. PCT/JP2013/082892, filed Dec. 6, 2013, through which and to which priority is claimed under 35 U.S.C. §119 to Japanese Patent Application No. 2012-272391, filed Dec. 13, 2012, the entire disclosure of which is hereby expressly incorporated by reference.

TECHNICAL FIELD

The present invention relates to an absorbent sheet for pets, more particularly to an absorbent sheet for pets which has excellent concealability for excrement.

BACKGROUND ART

Conventionally, absorbent sheets for pets have been provided to be used particularly for disposing excrement of pets which are kept indoors. For example, Japanese Unexamined Patent Application Publication JP 2012-130286A discloses an absorbent sheet for pets.

In the absorbent sheet for pets according to this prior art, a liquid-permeable colored sheet containing a black component is disposed between a liquid-permeable top sheet and an absorber. Further, a liquid-permeable intermediate sheet is disposed between the colored sheet and the top sheet. The intermediate sheet has an L* value larger than the black component of the colored sheet, has a lower total light transmittance than the top sheet and has liquid retainability.

When a pet excretes on this prior art absorbent sheet for pets, excrement penetrates the top sheet and reaches the intermediate sheet. Since the intermediate sheet has liquid retainability, it retains liquid and is pressed against the colored sheet disposed under the intermediate sheet. Further, since the intermediate sheet is also liquid-permeable, excrement in the intermediate sheet transfers to the colored sheet. At this time, the black component of the colored sheet stands out compared with a portion of the colored sheet which is not wet. Due to the liquid retainability of the intermediate sheet, the black component keeps standing out for some time.

Thereafter, excrement retained by the colored sheet is retained by the absorber. In the colored sheet through which excrement has passed, the black color of a black-based deodorant is inconspicuous. Therefore, by elapse of time after urination, it is made hard to identify the sheet as a used sheet after urination.

The absorbent sheet for pets according to this prior art is thus configured such that a user can easily recognize excretion of a pet on the absorbent sheet.

Depending on an absorbent sheet for pets to be obtained, however, it may be desired to prevent the outline of excreted urine from being easily recognized from the top sheet.

PRIOR ART DOCUMENT

Patent Document

Patent Document 1:
JP 2012-130286A

SUMMARY OF THE INVENTION

Problem to be Solved by the Invention

Accordingly, it is an object of the present invention to provide an absorbent sheet for pets which has excellent concealability for excrement.

Means for Solving the Problem

In order to solve the above-described problem, according to a preferred aspect of the present invention, an absorbent sheet for pets is provided which includes an excretion surface on which a pet excretes, a placing surface opposite to the excretion surface, a body outer edge that forms an outer edge of the absorbent sheet, an outward direction from an inner side of the absorbent sheet toward the body outer edge, an inward direction from the body outer edge toward the inside of the absorbent sheet, an absorber, an absorber outer edge that forms an outer edge of the absorber, an absorber outer edge region that includes the absorber outer edge region, an absorber central region that is formed inward of the absorber outer edge region in the inward direction, a coloration region that is visible from the excretion surface side. Further, the coloration region has a first coloration region, a second coloration region and a third coloration region, and a coloration pattern is formed by the first coloration region, the second coloration region and the third coloration region.

According to a further aspect of the absorbent sheet of the present invention, the first coloration region is provided as an excrement visual recognition region for making it easy to visually recognize excrement of pets.

According to a further aspect of the absorbent sheet of the present invention, the third coloration region is provided as an excrement concealing region for making it hard to visually recognize excrement of pets.

According to a further aspect of the absorbent sheet of the present invention, the first coloration region is formed in an outer region of the absorbent sheet in the outward direction, the second coloration region is formed inward of the first coloration region in the inward direction, and the third coloration region is formed inward of the second coloration region in the inward direction.

According to a further aspect of the absorbent sheet of the present invention, the first coloration region is formed in the absorber outer edge region.

According to a further aspect of the absorbent sheet of the present invention, the third coloration region is formed in the absorber central region.

According to a further aspect of the absorbent sheet of the present invention, the absorbent sheet has a longitudinal direction passing through an arbitrary point on the absorbent sheet and a transverse direction crossing the longitudinal direction, and the absorber has a first absorber end in the longitudinal direction and a second absorber end in the transverse direction.

According to a further aspect of the absorbent sheet of the present invention, the first coloration region is formed in the first absorber end.

According to a further aspect of the absorbent sheet of the present invention, the first coloration region is formed in the second absorber end.

According to a further aspect of the absorbent sheet of the present invention, the first coloration region is formed in the first absorber end and the second absorber end.

According to a further aspect of the absorbent sheet of the present invention, the absorbent sheet has a liquid-permeable top sheet that is disposed on the excretion surface side, a liquid-impermeable back sheet that is disposed on the placing surface side, a core layer that is provided in the absorber and has a core layer top surface formed on a side of the core layer facing the excretion surface, a core layer back surface formed on a side of the core layer facing the placing surface, and a core layer side surface between the core layer top surface and the core layer back surface, a first covering sheet that covers at least part of the core layer top surface and has a first covering sheet top surface formed on a side of the first covering sheet facing the excretion surface and a first covering sheet back surface formed on a side of the first covering sheet facing the placing surface, a second covering sheet that covers at least part of the core layer back surface, and an intermediate sheet that is disposed between the top sheet and the absorber and has an intermediate sheet top surface formed on a side of the intermediate sheet facing the excretion surface and an intermediate sheet back surface formed on a side of the intermediate sheet facing the placing surface.

According to a further aspect of the absorbent sheet of the present invention, the intermediate sheet has a higher fiber density than the top sheet.

According to a further aspect of the absorbent sheet of the present invention, the top sheet is formed of a through-air nonwoven fabric.

According to a further aspect of the absorbent sheet of the present invention, the intermediate sheet is formed of a composite nonwoven fabric having a meltblown nonwoven fabric layer between two spun-bond nonwoven fabric layers.

According to a further aspect of the absorbent sheet of the present invention, the intermediate sheet top surface has a smaller area than the core layer top surface, the first covering sheet has a first colored part that is different in coloration from other regions of the absorbent sheet, the first covering sheet top surface has a smaller area than the intermediate sheet top surface, the second covering sheet is formed to cover the core layer back surface, the core layer side surface and part of the core layer top surface, the first coloration region is formed by the second covering sheet, the second coloration region is formed by the first covering sheet, the second covering sheet and the intermediate sheet, and the third coloration region is formed by the intermediate sheet and the first covering sheet.

Effect of the Invention

According to the present invention, an absorbent sheet for pets can be provided which has high concealability for pet excrement and which allows a user to recognize the timing of changing the absorbent sheet.

BEST MODES FOR CARRYING OUT THE INVENTION

Basic Structure

A basic structure of an absorbent sheet for pets according to the present invention is now explained below with reference to FIGS. 1 to 4. The "pet" in this embodiment widely includes vertebrates (mammals, reptiles, birds and amphibians) and invertebrates, and typically represents pets such as cats, dogs, rabbits and hamsters.

The pet absorbent sheet 100 is a flat sheet having a prescribed thickness. The pet absorbent sheet 100 has a pet use mode in which it is spread out flat with a back sheet 160 placed on an intended place and receives excrement of pets. The pet absorbent sheet according to this embodiment preferably has a rectangular or square shape, but it may have a circular, elliptical or polygonal shape. The "excrement of pets" as used herein widely includes not only urine, but body fluids such as saliva and menstrual blood. In the pet use mode, a top sheet 100 has a planar structure serving both as a flat excrement receiving surface (hereinafter also referred to as a main absorbing region) for receiving excrement of pets in non-contact with pets and as a pet walking surface on which the pet can walk. The manner of placing the pet absorbent sheet on the "intended place" includes a manner of directly placing the pet absorbent sheet 100 on floor or the like, and a manner of setting the pet absorbent sheet 100 on a holder and placing it on floor or the like.

Figure 1:
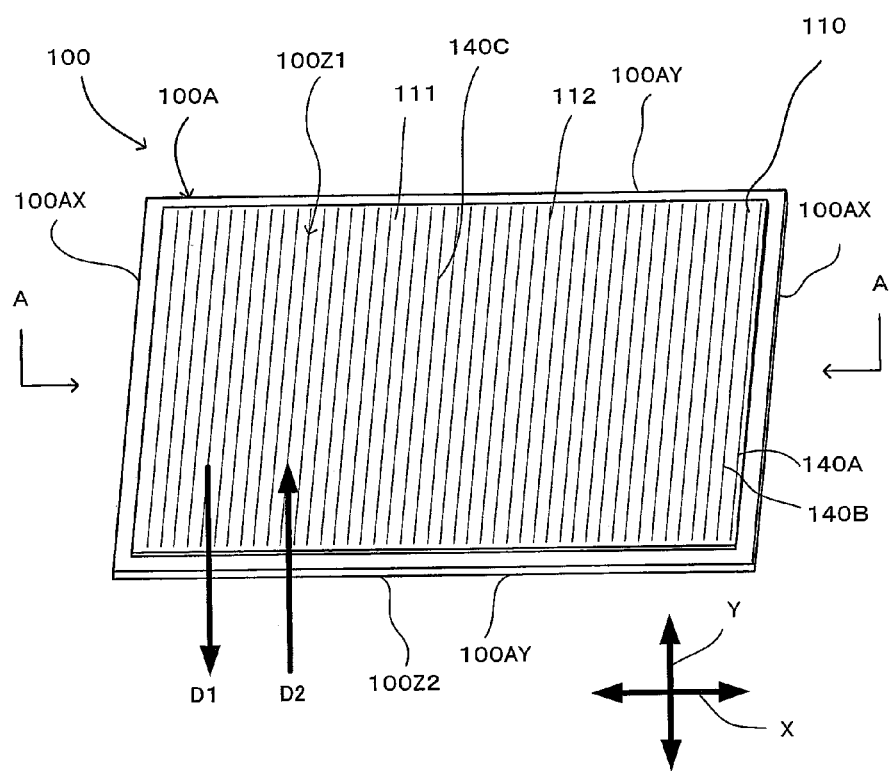
FIG. 1 is a perspective view showing an absorbent sheet for pets according to a basic structure of the present invention.

FIG. 1 is a perspective view showing the overall structure of the pet absorbent sheet 100 according to the basic structure of the present invention.

The pet absorbent sheet 100 has an excretion surface 100Z1 on which a pet excretes in the pet use mode and a placing surface 100Z2 which comes in contact with the intended place. The placing surface 100Z2 is opposed to the excretion surface 100Z1.

The excretion surface 100Z1 is an example embodiment that corresponds to the "excretion surface on which a pet excretes" according to the present invention.

The placing surface 100Z2 is an example embodiment that corresponds to the "placing surface opposite to the excretion surface" according to the present invention.

The pet absorbent sheet 100 has a body outer edge 100A that forms its outer edge. The body outer edge 100A is an example embodiment that corresponds to the "body outer edge that forms an outer edge of the absorbent sheet" according to the present invention.

Further, the pet absorbent sheet 100 has an outward direction D1 from an inner side of the pet absorbent sheet 100 toward the body outer edge 100A. The outward direction D1 is an example embodiment that corresponds to the "outward direction from an inner side of the absorbent sheet toward the body outer edge" according to the present invention.

The pet absorbent sheet 100 further has an inward direction D2 from the body outer edge 100A toward the inside of the absorbent sheet. The inward direction D2 is an example embodiment that corresponds to the "inward direction from the body outer edge toward the inside of the absorbent sheet" according to the present invention.

The pet absorbent sheet 100 further has an absorber 140. The absorber 140 is an example embodiment that corresponds to the "absorber" according to the present invention.

The absorber 140 has an absorber outer edge 140A that forms an outer edge of the absorber. The absorber outer edge 140A is an example embodiment that corresponds to the "absorber outer edge that forms an outer edge of the absorber" according to the present invention.

The absorber 140 has an absorber outer edge region 140B that includes the absorber outer edge 140A. The absorber outer edge region 140B is an example embodiment that corresponds to the "absorber outer edge region that includes the absorber outer edge" according to the present invention.

The absorber 140 further has an absorber central region 140C that is formed inward of the absorber outer edge region 140B in the inward direction D2. The absorber central region 140C is an example embodiment that corresponds to the "absorber central region that is formed inward of the absorber outer edge region in the inward direction" according to the present invention.

(First Basic Structure)

A first basic structure is now explained with reference to FIG. 2. Further, a variety of basic structures, embodiment patterns and embodiments relating to the present invention are explained below, but for the sake of explanation, all the absorbent sheets for pets are described as having a rectangular shape. As described above, however, the shape of the absorbent sheet for pets according to the present invention is not limited to a rectangular shape.

The pet absorbent sheet 100 has a coloration region 130 that is visible from the excretion surface 100Z1 side. The coloration region 130 is an example embodiment that corresponds to the "coloration region that is visible from the excretion surface side" according to the present invention.

The coloration region 130 has a first coloration region 130A, a second coloration region 130B and a third coloration region 130C. This is an example embodiment that corresponds to the feature that "the coloration region has a first coloration region, a second coloration region and a third coloration region" according to the present invention.

The first coloration region 130A, the second coloration region 130B and the third coloration region 130C form a coloration pattern. This is an example embodiment that corresponds to the feature that "a coloration pattern is formed by the first coloration region, the second coloration region and the third coloration region" according to the present invention.

Further, the "coloration pattern" in the present invention means that regions having different coloration are formed. The "coloration" as used herein does not only refer to color. The "coloration" according to the present invention includes lightness, brightness and gradation, and it is only necessary to make a user recognize a difference in coloration.

The first coloration region 130A is provided as an excrement visual recognition region for making it easy to visually recognize excrement of pets. This is an example embodiment that corresponds to the feature that "the first coloration region is provided as an excrement visual recognition region for making it easy to visually recognize excrement of pets" according to the present invention.

Specifically, the first coloration region has an $L^*$ value larger than 80 in an $L^*a^*b^*$ color system.

Having an $L^*$ value larger than 80 in the $L^*a^*b^*$ color system means having a "white" color. Having a white color here means that a dye or a pigment is not added or that a white dye or a white pigment is added.

By provision of the white first coloration region, when a pet excretes on the pet absorbent sheet 100, the user can visually recognize the color of the excrement as it is so that the user can recognize the excretion.

The third coloration region 130C is provided as an excrement concealing region for making it hard to visually recognize excrement of pets. This is an example embodiment that corresponds to the feature that "the third coloration region is provided as an excrement concealing region for making it hard to visually recognize excrement of pets" according to the present invention.

Specifically, the third coloration region 130C has an $L^*$ value of 50 or less in the $L^*a^*b^*$ color system.

The third coloration region 130C may however have an $L^*$ value larger than 0 but smaller than 100 and a $b^*$ value larger than −0.4 a in the $L^*a^*b^*$ color system.

Having an $L^*$ value of 50 or less in the $L^*a^*b^*$ color system means having a "black color". A black-based color absorbs coloring (coloration) colored by liquid excrement and thereby makes the excrement inconspicuous.

Further, having an $L^*$ value larger than 0 but smaller than 100 and a $b^*$ value larger than −0.4 a in the $L^*a^*b^*$ color system means having "yellow-, orange- and/or red-based color". Yellow-based, orange-based and red-based colors assimilate with the coloration pattern colored by liquid excrement and thereby make the excrement inconspicuous.

The first coloration region 130A is formed in an outer region of the pet absorbent sheet 100 in the outward direction D1. The second coloration region 130B is formed inward of the first coloration region 130A in the inward direction D2 of the pet absorbent sheet 100. The third coloration region 130C is formed inward of the second coloration region 130B in the inward direction D2. This is an example embodiment that corresponds to the feature that "the first coloration region is formed in an outer region of the absorbent sheet in the outward direction, the second coloration region is formed inward of the first coloration region in the inward direction, and the third coloration region is formed inward of the second coloration region in the inward direction" according to the present invention.

Specifically, the first coloration region 130A is formed in the absorber outer edge 140A. This is an example embodiment that corresponds to the feature that "the first coloration region is formed in the absorber outer edge region" according to the present invention.

Further, the third coloration region 130C is formed in the absorber central region 140C. This is an example embodiment that corresponds to the feature that "the third coloration region is formed in the absorber central region" according to the present invention.

Usually, most of pets excrete in a central region of the pet absorbent sheet, or the user tries to make a pet excrete in the central region of the pet absorbent sheet 100.

According to the pet absorbent sheet 100 of the present invention, by provision of the third coloration region 130C which is an excrement concealing region, excrement in the absorber central region 140C is made hard to visually recognize. Thus, the user can continue to use the pet absorbent sheet 100 without feeling serious discomfort. Therefore, the user can use one pet absorbent sheet 100 for a longer time.

The user tends to dislike adhesion of excrement to the outer edge 100A or its vicinity of the pet absorbent sheet 100. Specifically, it is because the outer edge 100A is close to the place such as floor on which the pet absorbent sheet 100 is placed.

Further, when a pet excretes on the pet absorbent sheet 100 several times, a lot of excrement is absorbed into the absorber 140. At this time, the excrement is spread over not only the absorber central region 140C but also the absorber outer edge region 140B.

According to the pet absorbent sheet 100 of the present invention, by provision of the first coloration region 130A which is the excrement visual recognition region, the excrement in the absorber outer edge region 140B is made easy to visually recognize. Therefore, the user can recognize the timing of changing the pet absorbent sheet 100.

Depending on the pet absorbent sheet 100 to be obtained, the second coloration region 130B may be configured as either the excrement concealing region or the excrement visual recognition region.

As for the pet absorbent sheet according to the present invention, for the sake of explanation, the second coloration region 130B is hereinafter explained as being configured as the "excrement concealing region".

The pet absorbent sheet 100 has a longitudinal direction Y passing through an arbitrary point on the pet absorbent sheet 100. The longitudinal direction Y is an example embodiment that corresponds to the "longitudinal direction passing through an arbitrary point on the pet absorbent sheet" according to the present invention.

Further, the pet absorbent sheet 100 has a transverse direction X crossing the longitudinal direction Y. The transverse direction X is an example embodiment that corresponds to the "transverse direction crossing the longitudinal direction Y" according to the present invention.

The absorber 140 has a first absorber end 140Y in the longitudinal direction Y and a second absorber end 140X in the transverse direction X. This is an example embodiment that corresponds to the feature that "the absorber has a first absorber end in the longitudinal direction and a second absorber end in the transverse direction" according to the present invention.

When the pet absorbent sheet 100 has a quadrilateral shape such as rectangle, square, trapezoid and parallelogram, the pet absorbent sheet 100 has a pair of the first absorber ends 140Y and a pair of the second absorber ends 140X.

Figure 2:
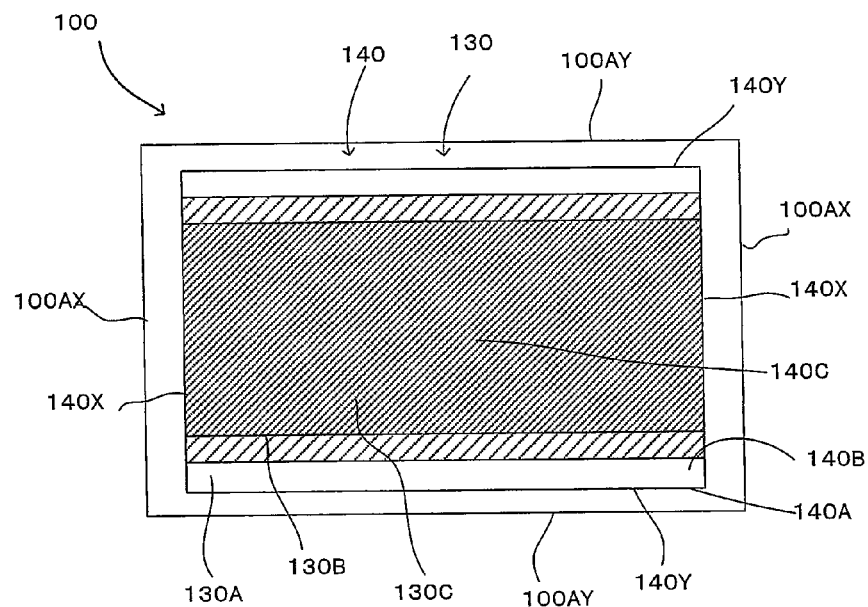
FIG. 2 is a plan view showing an absorbent sheet for pets according to a first basic structure of the present invention.

In the pet absorbent sheet 100 according to the first basic structure which is shown in FIG. 2, the first coloration region 130A is formed in the absorber outer edge region 140B along the first absorber end 140Y. This is an example embodiment that corresponds to the feature that "the first coloration region is formed in the first absorber end" according to the present invention.

(Second Basic Structure)

A second basic structure according to the present invention is explained with reference to FIG. 3.

In the pet absorbent sheet 100 according to the second basic structure, the first coloration region 130A is formed in the absorber outer edge region 140B along the second absorber end 140X. This is an example embodiment that corresponds to the feature that "the first coloration region is formed in the second absorber end" according to the present invention.

(Third Basic Structure)

A third basic structure according to the present invention is explained with reference to FIG. 4.

In the pet absorbent sheet 100 according to the third basic structure, the first coloration region 130A is formed in the absorber outer edge region 140B along the first absorber end 140Y and in the absorber outer edge region 140B along the second absorber end 140X. This is an example embodiment that corresponds to the feature that "the first coloration region is formed in the first absorber end and the second absorber end" according to the present invention.

First Embodiment Pattern

A first embodiment pattern according to the present invention is explained. In the first embodiment pattern, a single component of the pet absorbent sheet is colored. Then the first coloration region 130A, the second coloration region 130B and the third coloration region 130C of the coloration region 130 are formed by overlaying the colored component and other components one on another.

First Embodiment

Figure 5:
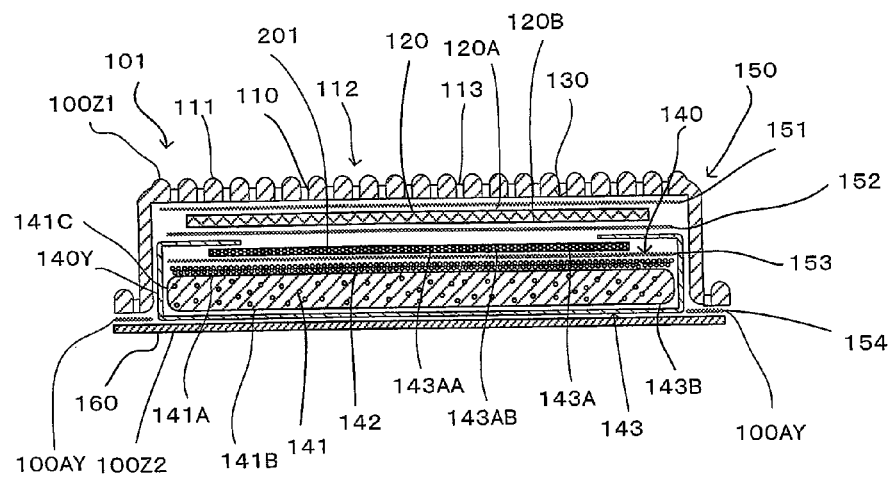
FIG. 5 is a sectional view showing an absorbent sheet for pets in a first embodiment according to a first embodiment pattern of the present invention.

A first embodiment according to the first embodiment pattern is now explained with reference to FIG. 5. FIG. 5 is a sectional view showing the pet absorbent sheet according to the first embodiment and corresponding to a sectional view showing the pet absorbent sheet 100 taken along line A-A in FIG. 1.

Further, components in this embodiment which are substantially identical to those shown in FIGS. 1 to 5 are given like designations and numerals, and not described.

The pet absorbent sheet 101 according to the first embodiment has a liquid-permeable top sheet 110 which is disposed on the excretion surface 100Z1 side. The top sheet 110 is an example embodiment that corresponds to the "liquid-permeable top sheet that is disposed on the excretion surface side" according to the present invention.

The pet absorbent sheet 101 further has a liquid-impermeable back sheet 160 which is disposed on the placing surface 100Z2 side. The back sheet 160 is an example embodiment that corresponds to the "liquid-impermeable back sheet that is disposed on the placing surface side" according to the present invention.

The pet absorbent sheet 101 further has a core layer 141 that is provided in the absorber 140, and the core layer 141 has a core layer top surface 141A formed on a side of the core layer 141 facing the excretion surface 100Z1, a core layer back surface 141B formed on a side of the core layer 141 facing the placing surface 100Z2, and a core layer side surface 141C between the core layer top surface 141A and the core layer back surface 141B.

This is an example embodiment that corresponds to "a core layer that is provided in the absorber and has a core layer top surface formed on a side of the core layer facing the excretion surface, a core layer back surface formed on a side of the core layer facing the placing surface, and a core layer side surface between the core layer top surface and the core layer back surface" according to the present invention.

The pet absorbent sheet 101 has a covering sheet 143 that covers the core layer.

The covering sheet 143 has a first covering sheet 143A that covers at least part of the core layer top sheet 141A, and the first covering sheet 143A has a first covering sheet top surface 143AA formed on a side of the first covering sheet 143A facing the excretion surface 100Z1 and a first covering sheet back surface 143AB formed on a side of the first covering sheet 143A facing the placing surface 100Z2.

This is an example embodiment that corresponds to "a first covering sheet that covers at least part of the core layer top sheet and has a first covering sheet top surface formed on a side of the first covering sheet facing the excretion surface and a first covering sheet back surface formed on a side of the first covering sheet facing the placing surface" according to the present invention.

Further, the covering sheet 143 has a second covering sheet 143B that covers at least part of the core layer back surface 141B. The second covering sheet 143B is an example embodiment that corresponds to the "second covering sheet that covers at least part of the core layer back surface" according to the present invention.

The pet absorbent sheet 101 further has an intermediate sheet 120 that is disposed between the top sheet 110 and the absorber 140 and has an intermediate sheet top surface 120A formed on a side of the intermediate sheet 120 facing the excretion surface 100Z1 and an intermediate sheet back surface 120B formed on a side of the intermediate sheet 120 facing the placing surface 100Z2.

This is an example embodiment that corresponds to "an intermediate sheet that is disposed between the top sheet and the absorber and has an intermediate sheet top surface formed on a side of the intermediate sheet facing the excretion surface and an intermediate sheet back surface formed on a side of the intermediate sheet facing the placing surface" according to the present invention.

The top sheet 110 and the back sheet 160 are formed to be slightly larger than the absorber 140. Peripheral edges of the top sheet 110 and the back sheet 160 are bonded together at an edge end bonding part 154, with the intermediate sheet 120 and the absorber 140 disposed between the top sheet 110 and the back sheet 160.

The intermediate sheet top surface 120A has a smaller area than the core layer top surface 141A. This is an example embodiment that corresponds to the feature that "the intermediate sheet top surface has a smaller area than the core layer top surface" according to the present invention.

The first covering sheet 143A has a first colored part 201 that is different in coloration from other regions of the pet absorbent sheet 101. This is an example embodiment that corresponds to the feature that "the first covering sheet has a first colored part that is different in coloration from other regions of the absorbent sheet" according to the present invention.

The first covering sheet top surface 143AA has a smaller area than the intermediate sheet top surface 120A. This is an example embodiment that corresponds to the feature that "the first covering sheet top surface has a smaller area than the intermediate sheet top surface" according to the present invention.

The second covering sheet 143B is formed to cover the core layer back surface 141B, the core layer side surface 141C and part of the core layer top surface 141A. This is an example embodiment that corresponds to the feature that "the second covering sheet is formed to cover the core layer back surface, the core layer side surface and part of the core layer top surface" according to the present invention.

Figure 6:
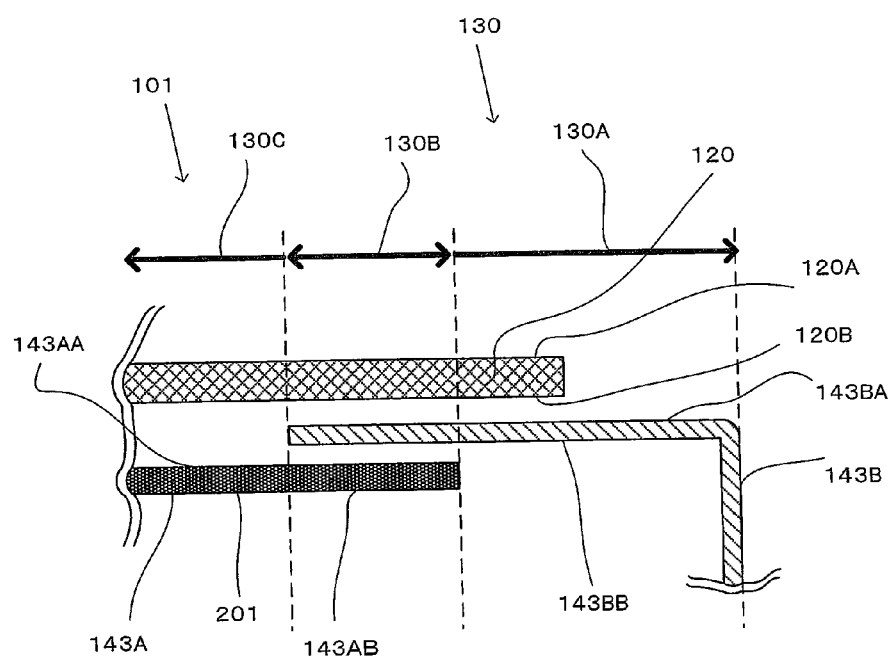
FIG. 6 is an explanatory drawing of a coloration region in the first embodiment according to the first embodiment pattern of the present invention.

The coloration region 130 of the pet absorbent sheet 101 according to the first embodiment is now explained with reference to FIG. 6.

In the first embodiment, only the first covering sheet 143A has the colored part 201. The other components, particularly the top sheet 110, the intermediate sheet 120 and the second covering sheet 143B are not colored and have a white color.

The first coloration region 130A is formed by the second covering sheet 143B. This is an example embodiment that corresponds to the feature that "the first coloration region comprises the second covering sheet" according to the present invention.

Specifically, in a top surface 143BA of the second covering sheet 143B which is disposed on the core layer top surface 141A, a region extending from the absorber end 140Y to the end of the first covering sheet 143A is referred to as the first coloration region 130A.

The second coloration region 130B is formed by the first covering sheet 143A, the second covering sheet 143B and the intermediate sheet 120. This is an example embodiment that corresponds to the feature that "the second coloration region comprises the first covering sheet, the second covering sheet and the intermediate sheet" according to the present invention.

Specifically, when a pet excretes on the pet absorbent sheet 101, excrement is retained by the second covering sheet 143B and concealed by the first covering sheet 143A disposed under the second covering sheet 143B.

The third coloration region 130C is formed by the intermediate sheet 120 and the first covering sheet 143A. This is an example embodiment that corresponds to the feature that "the third coloration region comprises the intermediate sheet and the first covering sheet" according to the present invention.

In the first embodiment, the white intermediate sheet 120 and the white second covering sheet 143B are overlaid on the colored first covering sheet top surface 143AA in the second coloration region 130B.

In the third coloration region 130C, only the white intermediate sheet 120 is overlaid on the colored first covering sheet top surface 143AA.

Therefore, the second coloration region 130B has a brighter coloration pattern than the third coloration region 130C.

In the first embodiment, the first covering sheet top surface 143AA has a smaller area than the intermediate top surface 120A. This is realized by making the length between both ends of the first covering sheet 143A in the longitudinal direction Y shorter than that of the intermediate sheet 120 in the longitudinal direction Y.

When the pet absorbent sheet 101 according to this first embodiment is viewed in a plan view, the coloration region 130 has the same arrangement as the above-described first basic structure shown in FIG. 2.

In place of such a structure, for example, the length between both ends of the first covering sheet 143A in the transverse direction X may be made shorter than that of the intermediate sheet 120 in the transverse direction X.

Figure 3:
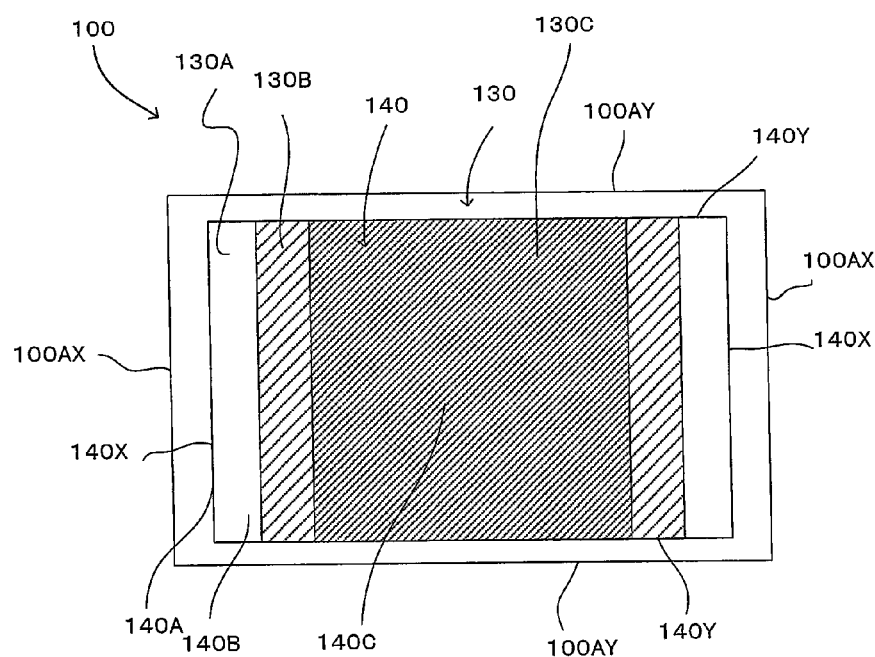
FIG. 3 is a plan view showing an absorbent sheet for pets according to a second basic structure of the present invention.

When the pet absorbent sheet 101 having such a structure is viewed in a plan view, the coloration region 130 has the same arrangement as the above-described second basic structure shown in FIG. 3.

As a further alternative, for example, the length between both ends of the first covering sheet 143A in the longitudinal direction Y may be made shorter than that of the intermediate sheet 120 in the longitudinal direction Y and the length between both ends of the first covering sheet 143A in the transverse direction X may be made shorter than that of the intermediate sheet 120 in the transverse direction X.

Figure 4:
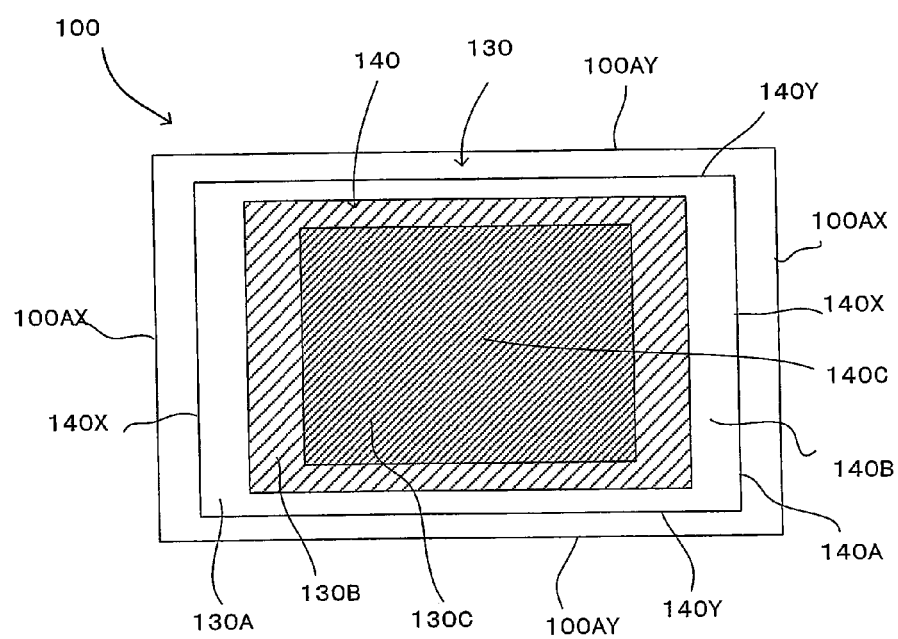
FIG. 4 is a plan view showing an absorbent sheet for pets according to a third basic structure of the present invention.

When the pet absorbent sheet 101 having such a structure is viewed in a plan view, the coloration region 130 has the same arrangement as the above-described third basic structure shown in FIG. 4.

Each of components of the pet absorbent sheet 101 is now explained.

The top sheet 110 may be formed of thermoplastic nonwoven fabric, including a spun-bond nonwoven fabric of thermoplastic long fibers, a through-air nonwoven fabric of thermoplastic short fibers, a point-bond nonwoven fabric and a perforated film.

Particularly as the top sheet 110 according to the present invention, a through-air nonwoven fabric is used. This is an example embodiment that corresponds to the feature that "the top sheet comprises a through-air nonwoven fabric" according to the present invention.

The top sheet 110 has ridges 111, grooves 112 which are each formed between adjacent ones of the ridges 111, and openings 113 which are formed at intervals and extend along the grooves 112.

The ridges 111 and the grooves 112 of the top sheet 110 form a surface layer of the excretion surface 100Z1, or a part of the pet absorbent sheet which is closest to the user when the user visually checks the absorbent sheet.

Thus, when the user visually checks the pet absorbent sheet 101, the ridges 111 and the grooves 112 of the top sheet 110 are first strongly recognized by the user.

As a result, especially an outline of liquid excrement can be prevented from being easily recognized.

The intermediate sheet 120 may be formed of thermoplastic nonwoven fabric, including a through-air nonwoven fabric, a point-bond nonwoven fabric or spun-bond nonwoven fabric.

Figure 7:
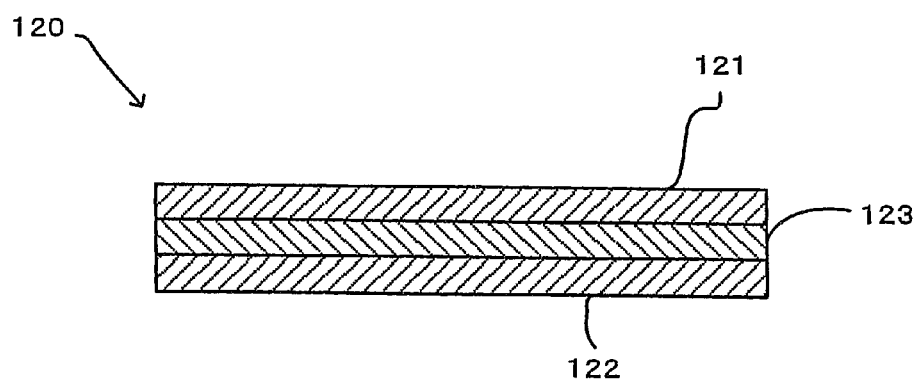
FIG. 7 is an explanatory drawing of an intermediate sheet.

As shown in FIG. 7, as the intermediate sheet 120, preferably, a composite nonwoven fabric having a meltblown nonwoven fabric layer 123 between a first spun-bond nonwoven fabric layer 121 and a second spun-bond nonwoven fabric layer 122 is used. The composite nonwoven fabric may be referred to as SMS (spunbond/meltblown/spunbond) nonwoven fabric. It is preferable that the SMS nonwoven fabric to be used for the intermediate sheet 120 has a basis weight of 8 to 25 g/m$^2$.

The intermediate sheet 120 is an example embodiment that corresponds to the "intermediate sheet that comprises a composite nonwoven fabric having a meltblown nonwoven fabric layer between two spun-bond nonwoven fabric layers" according to the present invention.

The SMS nonwoven fabric forming the intermediate sheet 120 has a higher fiber density than the top sheet 110. This is an example embodiment that corresponds to the feature that "the intermediate sheet has a higher fiber density than the top sheet" according to the present invention.

With such a structure, the intermediate sheet 120 has excellent liquid suction ability by capillary action. Therefore, the intermediate sheet 120 can quickly suck liquid excrement from the top sheet 110.

As a result, the amount of liquid excrement remaining in the top sheet 110 can be reduced.

Therefore, it can be made hard to visually recognize the liquid excrement from the excretion surface 101 of the top sheet 110.

The absorber 140 of the pet absorbent sheet 101 has the core layer 141 and a super absorbent polymer layer 142 that is disposed on a top of the core layer 141.

A laminate including the core layer 141 and the super absorbent polymer layer 142 is covered by the covering sheet 143.

In the first embodiment, the covering sheet 143 has the first covering sheet 143A that covers the core layer top surface 141A.

The covering sheet 143 further has the second covering sheet 143B that covers the core layer back surface 141B, the core layer side surface 141C and part of the core layer top surface 141A.

Further, a portion of the second covering sheet 143B which covers part of the core layer top surface 141A is disposed on the first covering sheet 143A disposed on the core layer top surface 141A.

The core layer 141 may be formed of a mixture of particulate or fibrous super absorbent polymer and fluff pulp, or a mixture of particulate or fibrous super absorbent polymer, fluff pulp and thermoplastic synthetic resin fibers.

The super absorbent polymer layer 142 is formed by dispersing super absorbent polymer on the top of the core layer 141.

The first covering sheet 143A and the second covering sheet 143B of the covering sheet 143 are formed of tissue paper and provided to prevent deformation of the super absorbent polymer layer 142 and the core layer 141.

The back sheet 160 may be preferably formed particularly of a resin film sheet in order to reliably secure its liquid-impermeability. For example, a film of polyethylene, polypropylene or polyethylene terephthalate may be used to form the back sheet 160. Further, in consideration of flexibility, the back sheet may be formed of a nonwoven fabric to which a water repellent is applied.

A bonding part 150 is provided to bond the top sheet 110 and the intermediate sheet 120, the intermediate sheet 120 and the first covering sheet 143A, the first covering sheet 143A and the super absorbent polymer layer 142, and the top sheet 110 and the back sheet 160.

The bonding part 150 includes a surface layer side bonding part 151 for bonding the top sheet 110 and the intermediate sheet 120, an intermediate bonding part 152 for bonding the intermediate sheet 120 and the first covering sheet 143A, an absorber side bonding part 153 for bonding the first covering sheet 143A and the super absorbent polymer layer 142, and an edge end bonding part 154 for bonding the top sheet 110 and the back sheet 160.

A hot-melt adhesive is used in the surface layer side bonding part 151, the intermediate bonding part 152 and the edge end bonding part 154. The hot-melt adhesive is also referred to as HMA (Hot Melting Adhesive).

The hot-melt adhesive can be applied to the surface layer side bonding part 151, the intermediate bonding part 152 and the edge end bonding part 154 in a spiral or linear pattern.

Further, the surface layer side bonding part 151 and the intermediate bonding part 152 are preferably subjected to curtain spray coating. In the curtain spray coating, the hot-melt adhesive is discharged in the form of fine fibers and uniformly applied.

In the curtain spray coating, an adhesive coating of 0.1 to 1.0 g/m$^2$ is particularly preferable. Under this condition, when the top sheet 110, the intermediate sheet 120 and the absorber 140 absorb excrement, the intermediate sheet 120 and the absorber 140 are separated from each other by deformation due to expansion.

The edge end bonding part 154 is preferably subjected to bead coating because the top sheet 110 and the back sheet 160 must be firmly bonded together.

In the bead coating, the hot-melt adhesive is linearly applied in non-contact with the bonding part along a machine direction in the manufacturing process. Therefore, the hot-melt adhesive is applied in a fine line, so that a small amount of hot-melt adhesive can be provided with a high basis weight.

In the absorber side bonding part 153, the first covering sheet 143A and the super absorbent polymer layer 142 are bonded together by water spray. In the water spray, water is sprayed over the super absorbent polymer layer 142 to bond the first covering sheet 143A thereto in the manufacturing process, so that deformation of the absorber can be prevented. After sprayed, the water evaporates. Thus, the water sprayed part of the pet absorbent sheet 100 is dry in user's actual use of the pet absorbent sheet 100.

Second Embodiment Pattern

Figure 8:
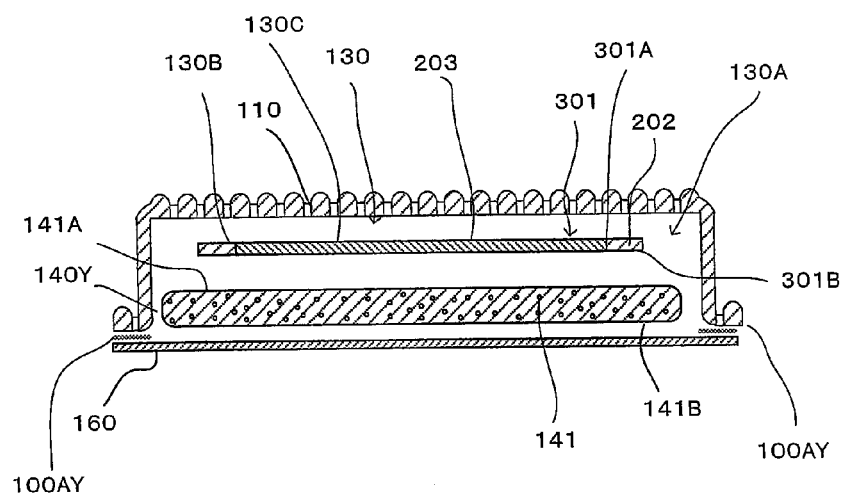
FIG. 8 is a sectional view showing an absorbent sheet for pets according to a second embodiment pattern of the present invention.
Figure 9:
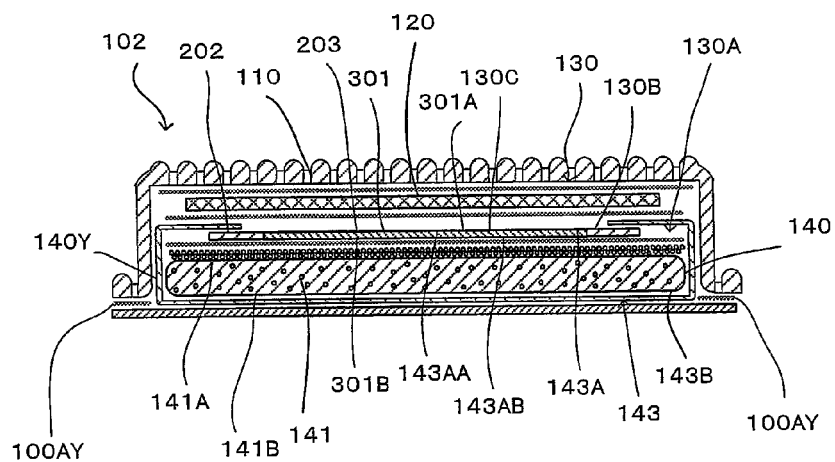
FIG. 9 is a sectional view showing an absorbent sheet for pets in a second embodiment according to the second embodiment pattern of the present invention.
Figure 10:
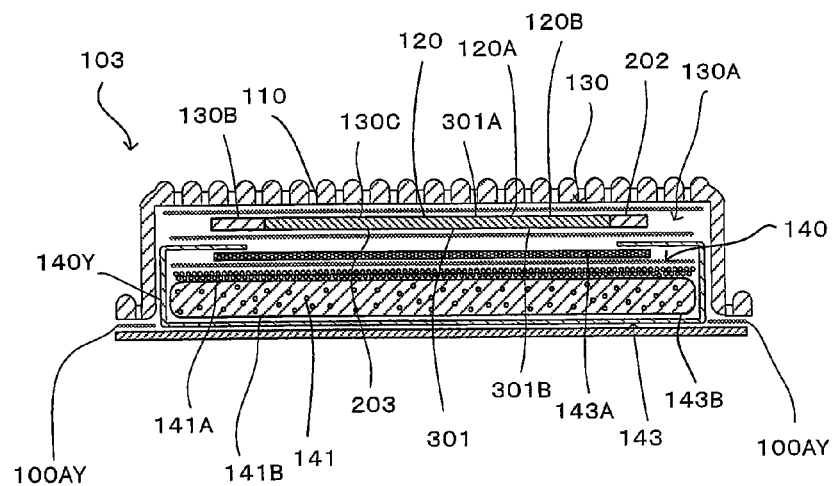
FIG. 10 is a sectional view showing an absorbent sheet for pets in a third embodiment according to the second embodiment pattern of the present invention.

A second embodiment pattern is now explained with reference to FIG. 8. Further, a second embodiment according to the second embodiment pattern is explained with reference to FIG. 9, and a third embodiment according to the second embodiment pattern is explained with reference to FIG. 10. FIGS. 8 to 10 are sectional views showing the pet absorbent sheet and corresponding to the sectional view showing the pet absorbent sheet 100 taken along line A-A in FIG. 1.

Further, components which are substantially identical to those in the above-described basic structures shown in FIGS. 1 to 7 are given like designations and numerals, and not described.

The pet absorbent sheet according to the second embodiment pattern has a first colored sheet 301. The first colored sheet 301 has a second colored part 202 which is different in coloration from other regions of the pet absorbent sheet, and a third colored part 203 which is different in coloration from other regions of the pet absorbent sheet and the second colored part 202.

The first colored sheet 301 further has a first colored sheet top surface 301A formed on a side of the first colored sheet 301 facing the excretion surface 100Z1, and a first colored sheet back surface 301B formed on a side of the first colored sheet 301 facing the placing surface 100Z2.

The first colored sheet top surface 301A has a smaller area than the core layer top surface 141A.

The first coloration region 130A is formed by a region in which the first colored sheet 301 is not disposed on the core layer top surface 141A.

The second coloration region 130B is formed by the second colored part 202.

The third coloration region 130C is formed by the third colored part 203.

In the second embodiment pattern, the first colored sheet top surface 301A has a smaller area than the core layer top surface 141A. This is realized by making the length between both ends of the first colored sheet 301 in the longitudinal direction Y shorter than that of the core layer 141 in the longitudinal direction Y.

When the pet absorbent sheet according to this second embodiment pattern is viewed in a plan view, the coloration region 130 has the same arrangement as the above-described first basic structure shown in FIG. 2.

In place of such a structure, for example, the length between both ends of the first colored sheet 301 in the transverse direction X may be made shorter than that of the core layer 141 in the transverse direction X.

When the pet absorbent sheet having such a structure is viewed in a plan view, the coloration region 130 has the same arrangement as the above-described second basic structure shown in FIG. 3.

As a further alternative, for example, the length between both ends of the first colored sheet 301 in the longitudinal direction Y may be made shorter than that of the core layer 141 in the longitudinal direction Y and the length between both ends of the first colored sheet 301 in the transverse direction X may be made shorter than that of the core layer 141 in the transverse direction X.

When the pet absorbent sheet 101 having such a structure is viewed in a plan view, the coloration region 130 has the same arrangement as the above-described third basic structure shown in FIG. 4.

Second Embodiment

A second embodiment according to the present invention is explained with reference to FIG. 9.

In a pet absorbent sheet 102, the first colored sheet 301 is the first covering sheet 143A.

Third Embodiment

A third embodiment according to the present invention is explained with reference to FIG. 10.

In a pet absorbent sheet 103, the first colored sheet 301 is the intermediate sheet 120.

Third Embodiment Pattern

Figure 11:
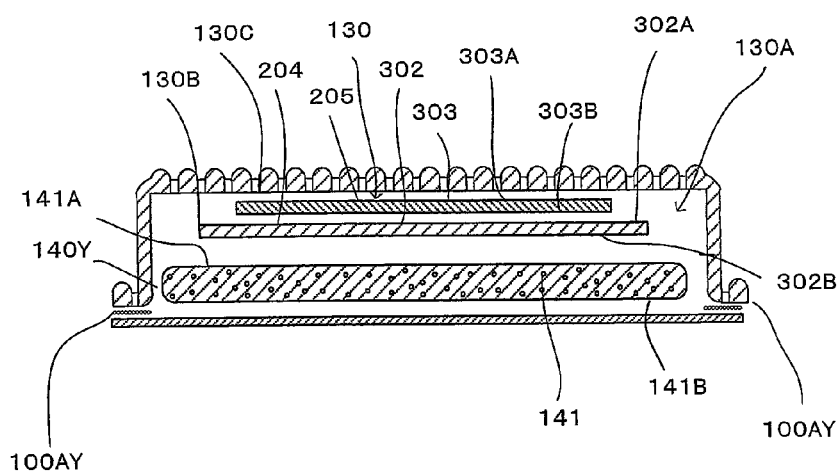
FIG. 11 is a sectional view showing an absorbent sheet for pets according to a third embodiment pattern of the present invention.

A third embodiment pattern is now explained with reference to FIG. 11. Further, fourth to sixth embodiments according to the third embodiment pattern are explained with reference to FIGS. 12 to 14, respectively.

FIGS. 11 to 14 are sectional views showing the pet absorbent sheet and corresponding to the sectional view showing the pet absorbent sheet 100 taken along line A-A in FIG. 1.

Further, components which are substantially identical to those in the above-described basic structures shown in FIGS. 1 to 10 are given like designations and numerals, and not described.

The pet absorbent sheet according to the third embodiment pattern has a second colored sheet 302 that has a fourth colored part 204 which is different in coloration from other regions of the pet absorbent sheet.

The pet absorbent sheet further has a third colored sheet 303 that has a fifth colored part 205 which is different in coloration from other regions of the pet absorbent sheet and the fourth colored part 204.

The second colored sheet 302 further has a second colored sheet top surface 302A that is formed on a side of the second colored sheet 302 facing the excretion surface 100Z1 and a second colored sheet back surface 302B that is formed on a side of the second colored sheet 302 facing the placing surface 100Z2.

The third colored sheet 303 further has a third colored sheet top surface 303A that is formed on a side of the third colored sheet 303 facing the excretion surface 100Z1 and a third colored sheet back surface 303B that is formed on a side of the third colored sheet 303 facing the placing surface 100Z2.

The second colored sheet top surface 302A has a smaller area than the core layer top surface 141A.

The third colored sheet top surface 303A has a smaller area than the second colored sheet top surface 302A.

The third colored sheet 303 is disposed on the excretion surface 100Z1 side of the second colored sheet top surface 302A.

The first coloration region 130A is formed by a region in which the second colored sheet 302 and the third colored sheet 303 are not disposed on the core layer top surface 141A.

The second coloration region 130B is formed by the fourth colored part 204.

The third coloration region 130C is formed by the fifth colored part 205.

In the third embodiment pattern, the second colored sheet top surface 302A has a smaller area than the core layer top surface 141A. This is realized by making the length between both ends of the first colored sheet 301 in the longitudinal direction Y shorter than that of the core layer 141 in the longitudinal direction Y.

Further, the third colored sheet top surface 303A has a smaller area than the second colored sheet top surface 302A. This is realized by making the length between both ends of the third colored sheet 303 in the longitudinal direction Y shorter than that of the second colored sheet 302 in the longitudinal direction Y.

When the pet absorbent sheet according to this third embodiment pattern is viewed in a plan view, the coloration region 130 has the same arrangement as the above-described first basic structure shown in FIG. 2.

In place of such a structure, for example, the length between both ends of the second colored sheet 302 in the transverse direction X may be made shorter than that of the core layer 141 in the transverse direction X.

Further, the length between both ends of the third colored sheet 303 in the transverse direction X may be made shorter than that of the second colored sheet 302 in the transverse direction X.

When the pet absorbent sheet having such a structure is viewed in a plan view, the coloration region 130 has the same arrangement as the above-described second basic structure shown in FIG. 3.

As a further alternative, for example, the length between both ends of the second colored sheet 302 in the longitudinal direction Y may be made shorter than that of the core layer 141 in the longitudinal direction Y and the length between both ends of the second colored sheet 302 in the transverse direction X may be made shorter than that of the core layer 141 in the transverse direction X.

Further, the length between both ends of the third colored sheet 303 in the longitudinal direction Y may be made shorter than that of the second colored sheet 302 in the longitudinal direction Y and the length between both ends of the third colored sheet 303 in the transverse direction X may be made shorter than that of the second colored sheet 302 in the transverse direction X.

When the pet absorbent sheet 101 having such a structure is viewed in a plan view, the coloration region 130 has the same arrangement as the above-described third basic structure shown in FIG. 4.

Fourth Embodiment

Figure 12:
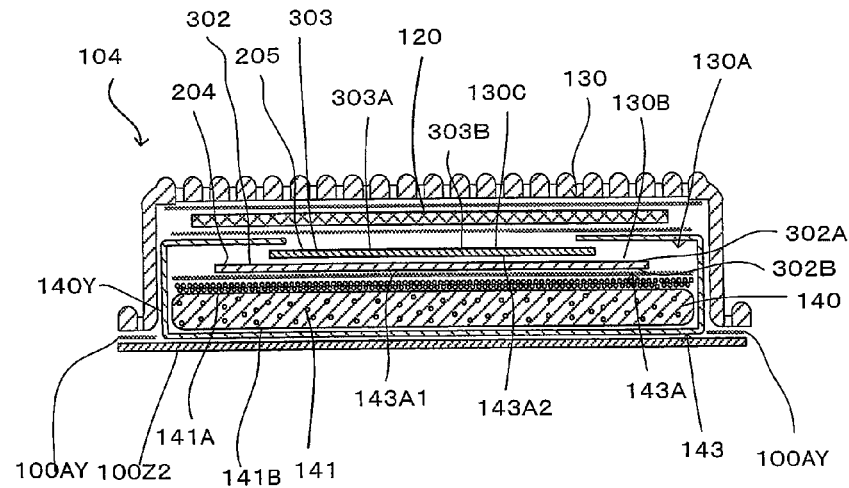
FIG. 12 is a sectional view showing an absorbent sheet for pets in a fourth embodiment according to the third embodiment pattern of the present invention.

A fourth embodiment according to the present invention is explained with reference to FIG. 12.

In a pet absorbent sheet 104, the first covering sheet 143A includes one first covering sheet 143A1 and the other first covering sheet 143A2.

The one first covering sheet 143A1 is the second colored sheet 302.

The other first covering sheet 143A2 is the third colored sheet 303.

Fifth Embodiment

Figure 13:
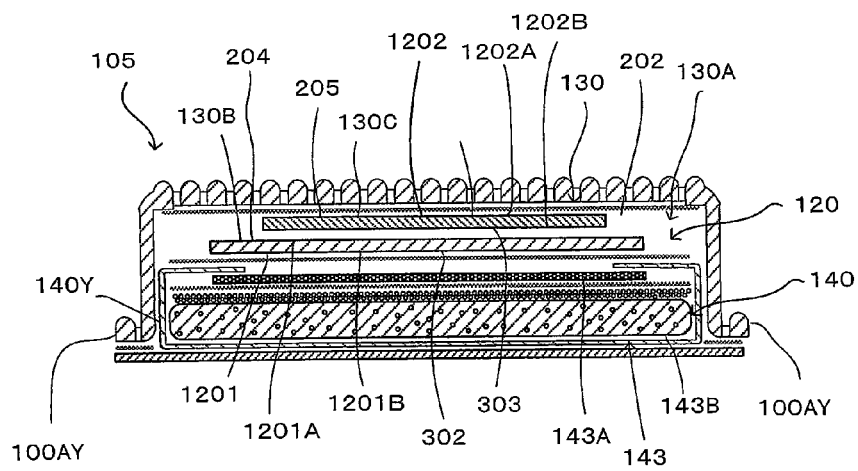
FIG. 13 is a sectional view showing an absorbent sheet for pets in a fifth embodiment according to the third embodiment pattern of the present invention.

A fifth embodiment according to the present invention is explained with reference to FIG. 13.

In a pet absorbent sheet 105, the intermediate sheet 120 includes one intermediate sheet 1201 and the other intermediate sheet 1202.

The one intermediate sheet 1201 is the second colored sheet 302.

The other intermediate sheet 1202 is the third colored sheet 303.

Sixth Embodiment

Figure 14:
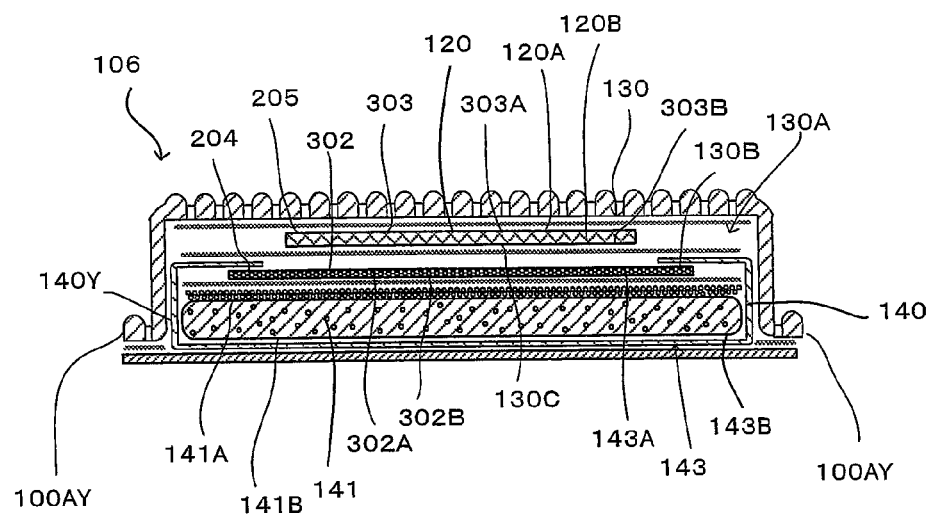
FIG. 14 is a sectional view showing an absorbent sheet for pets in a sixth embodiment according to the third embodiment pattern of the present invention.

A sixth embodiment according to the present invention is explained with reference to FIG. 14.

In a pet absorbent sheet 106, the first covering sheet 143A is the second colored sheet 302.

Further, the intermediate sheet 120 is the third colored sheet 303.

Fourth Embodiment Pattern

Figure 15:
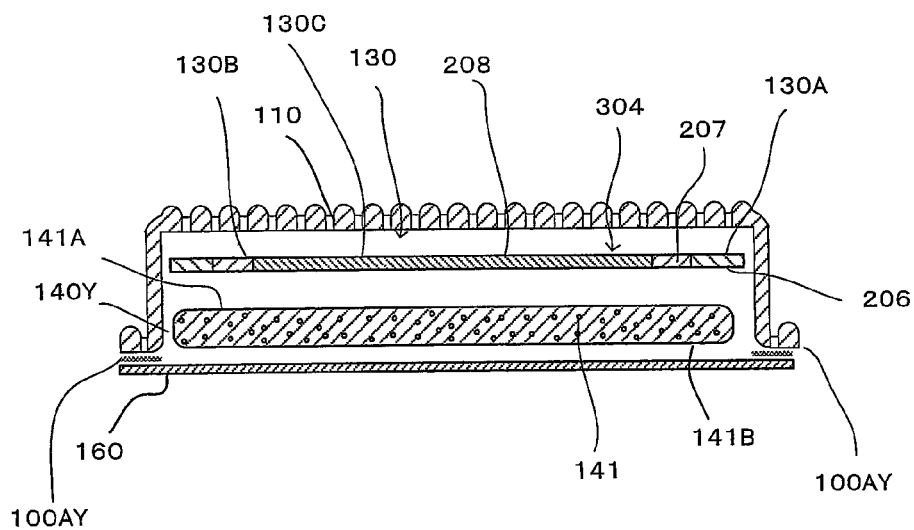
FIG. 15 is a sectional view showing an absorbent sheet for pets according to a fourth embodiment pattern of the present invention.

A fourth embodiment pattern is now explained with reference to FIG. 15. Further, seventh to ninth embodiments according to the fourth embodiment pattern are explained with reference to FIGS. 16 to 18, respectively. FIGS. 15 to 18 are sectional views showing the pet absorbent sheet and corresponding to the sectional view showing the pet absorbent sheet 100 taken along line A-A in FIG. 1.

Further, components which are substantially identical to those in the above-described basic structures shown in FIGS. 1 to 14 are given like designations and numerals, and not described.

The pet absorbent sheet according to the fourth embodiment pattern has a fourth colored sheet 304.

Further, the fourth colored sheet 304 has a sixth colored part 206, a seventh colored part 207 that is different in coloration from the sixth colored part 206, and an eighth colored part 208 that is different in coloration from the sixth colored part 206 and the seventh colored part 207.

The first coloration region 130A is formed by the sixth colored part 206.

The second coloration region 130B is formed by the seventh colored part 207.

The third coloration region 130C is formed by the eighth colored part 208.

In the fourth embodiment pattern, the sixth colored part 206 is provided in a region of the fourth colored sheet 304 in the transverse direction X which includes both ends of the fourth colored sheet 304 in the longitudinal direction Y.

When the pet absorbent sheet according to the fourth embodiment pattern is viewed in a plan view, the coloration region 130 has the same arrangement as the above-described first basic structure shown in FIG. 2.

In place of such a structure, for example, the sixth colored part 206 may be provided in a region of the fourth colored sheet 304 in the longitudinal direction Y which includes both ends of the fourth colored sheet 304 in the transverse direction X.

When the pet absorbent sheet having such a structure is viewed in a plan view, the coloration region 130 has the same arrangement as the above-described second basic structure shown in FIG. 3.

As a further alternative, for example, the sixth colored part 206 may be provided in a region of the fourth colored sheet 304 in the transverse direction X which includes both ends of the fourth colored sheet 304 in the longitudinal direction Y, and in a region of the fourth colored sheet 304 in the longitudinal direction Y which includes both ends of the fourth colored sheet 304 in the transverse direction X.

When the pet absorbent sheet 101 having such a structure is viewed in a plan view, the coloration region 130 has the same arrangement as the above-described third basic structure shown in FIG. 4.

Furthermore, the fourth colored sheet 304 may not be colored in the sixth colored part 206.

Seventh Embodiment

Figure 16:
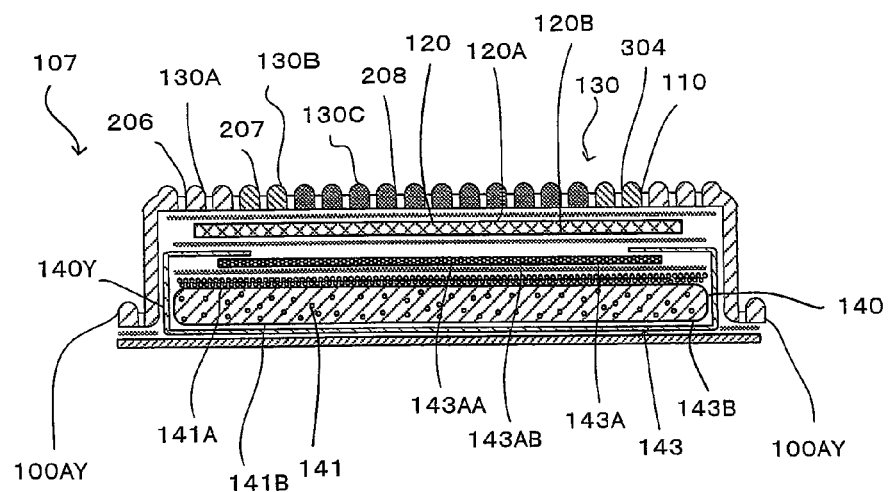
FIG. 16 is a sectional view showing an absorbent sheet for pets in a seventh embodiment according to the fourth embodiment pattern of the present invention.

A seventh embodiment according to the present invention is explained with reference to FIG. 16.

In a pet absorbent sheet 107, the fourth colored sheet 304 is the top sheet 110.

Eighth Embodiment

Figure 17:
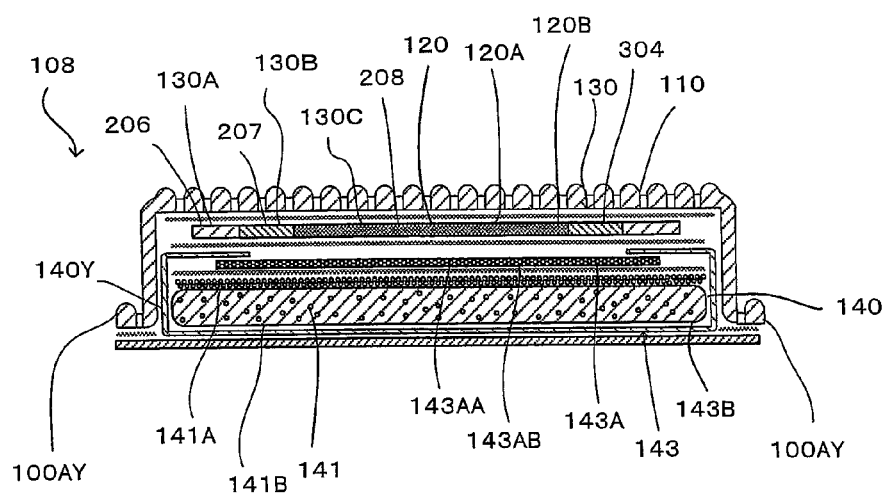
FIG. 17 is a sectional view showing an absorbent sheet for pets in an eighth embodiment according to the fourth embodiment pattern of the present invention.

An eighth embodiment according to the present invention is explained with reference to FIG. 17.

In a pet absorbent sheet 108, the fourth colored sheet 304 is the intermediate sheet 120.

Ninth Embodiment

Figure 18:
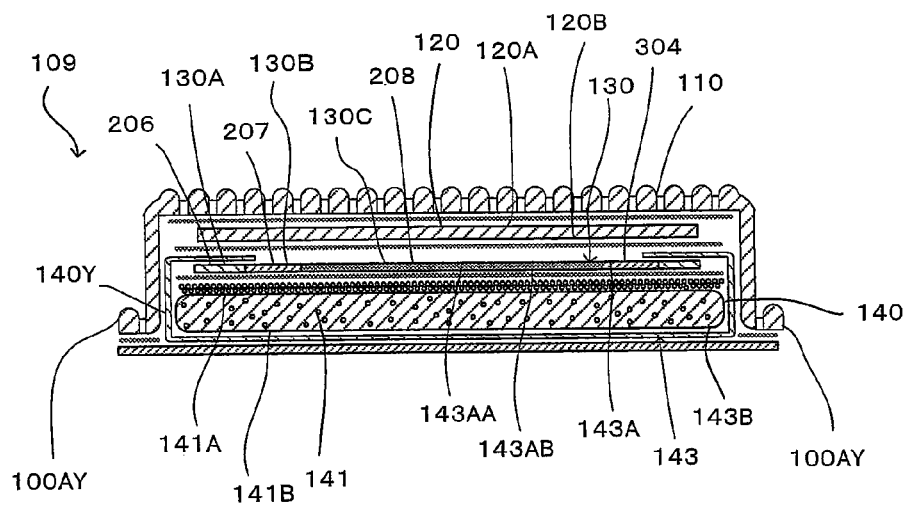
FIG. 18 is a sectional view showing an absorbent sheet for pets in a ninth embodiment according to the fourth embodiment pattern of the present invention.

A ninth embodiment according to the present invention is explained with reference to FIG. 18.

In the pet absorbent sheet 109, the fourth colored sheet 304 is the first covering sheet 143A.

Fifth Embodiment Pattern

A fifth embodiment pattern according to the present invention is explained. In the fifth embodiment pattern, the core layer 141 of the absorber 140 is colored.

Tenth Embodiment

Figure 19:
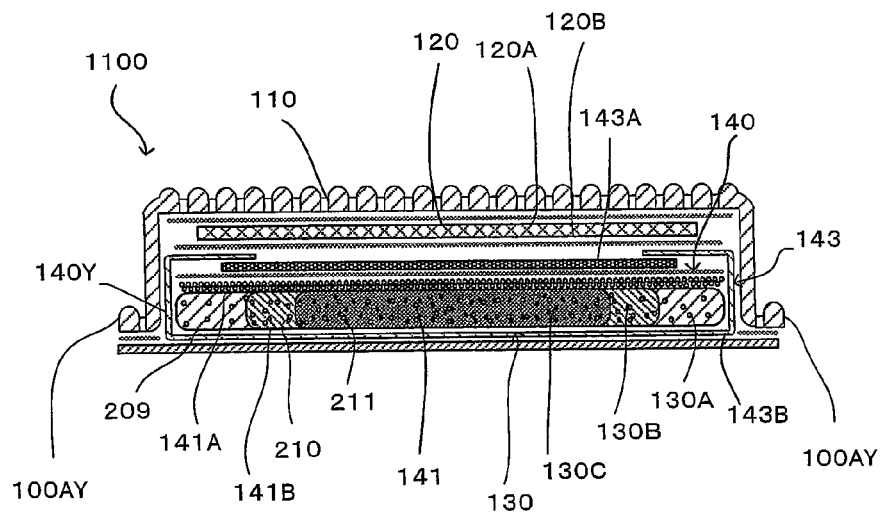
FIG. 19 is a sectional view showing an absorbent sheet for pets in a tenth embodiment according to a fifth embodiment pattern of the present invention.

A tenth embodiment according to the fifth embodiment pattern is now explained with reference to FIG. 19. FIG. 19 is a sectional view showing the pet absorbent sheet according to the tenth embodiment and corresponding to a sectional view showing the pet absorbent sheet 100 taken along line A-A in FIG. 1.

Further, components which are substantially identical to those in the above-described basic structures shown in FIGS. 1 to 18 are given like designations and numerals, and not described.

In a pet absorbent sheet 1100, the core layer 141 has a ninth colored part 209, a tenth colored part 210 that is different in coloration from the ninth colored part 209, and an eleventh colored part 211 that is different in coloration from the ninth colored part 209 and the tenth colored part 210.

The first coloration region 130A is formed by the ninth colored part 209.

The second coloration region 130B is formed by the tenth colored part 210.

The third coloration region 130C is formed by the eleventh colored part 211.

In the tenth embodiment, the ninth colored part 209 is provided in a region of the absorber 140 in the transverse direction X which includes both ends of the absorber 140 in the longitudinal direction Y.

When the pet absorbent sheet 1100 according to the tenth embodiment is viewed in a plan view, the coloration region 130 has the same arrangement as the above-described first basic structure shown in FIG. 2.

In place of such a structure, for example, the ninth colored part 209 may be provided in a region of the absorber 140 in the longitudinal direction Y which includes both ends of the absorber 140 in the transverse direction X.

When the pet absorbent sheet 1100 having such a structure is viewed in a plan view, the coloration region 130 has the same arrangement as the above-described second basic structure shown in FIG. 3.

As a further alternative, for example, the ninth colored part 209 may be provided in the region of the absorber 140 in the transverse direction X which includes both ends of the absorber 140 in the longitudinal direction Y and in the region of the absorber 140 in the longitudinal direction Y which includes both ends of the absorber 140 in the transverse direction X.

When the pet absorbent sheet 1100 having such a structure is viewed in a plan view, the coloration region 130 has the same arrangement as the above-described third basic structure shown in FIG. 4.

Furthermore, the absorber 140 may not be colored in the ninth colored part 209.

The basic structure, the first to third basic structures, the first to fifth embodiment patterns and the first to tenth embodiments which are described above are described merely as examples.

Naturally, therefore, other structures may be selected, and the basic structure, the first to third basic structures, the first to fifth embodiment patterns and the first to tenth embodiments which are described above may be appropriately applied in combination.

Correspondences Between the Features of the Embodiments and the Features of the Invention The pet absorbent sheets 100, 101, 102, 103, 104, 105, 106, 107, 108, 109, 110, 1100 are example embodiments that correspond to the "absorbent sheet for pets" according to the present invention. The excretion surface 100Z1 is an example embodiment that corresponds to the "excretion surface" according to the present invention. The placing surface 100Z2 is an example embodiment that corresponds to the "placing surface" according to the present invention. The body outer edge 100A is an example embodiment that corresponds to the "body outer edge" according to the present invention. The outward direction D1 is an example embodiment that corresponds to the "outward direction" according to the present invention. The inward direction D2 is an example embodiment that corresponds to the "inward direction" according to the present invention. The absorber 140 is an example embodiment that corresponds to the "absorber" according to the present invention. The absorber outer edge 140A is an example embodiment that corresponds to the "absorber outer edge" according to the present invention. The absorber outer edge region 140B is an example embodiment that corresponds to the "absorber outer edge region" according to the present invention. The absorber central region 140C is an example embodiment that corresponds to the "absorber central region" according to the present invention. The coloration region 130 is an example embodiment that corresponds to the "coloration region" according to the present invention. The first to third coloration regions 130A, 130B and 130C are example embodiments that correspond to the "first coloration region", the "second coloration region" and "third coloration region", respectively, according to the present invention. The longitudinal direction Y is an example embodiment that corresponds to the "longitudinal direction" according to the present invention. The transverse direction X is an example embodiment that corresponds to the "transverse direction" according to the present invention. The first absorber end 140Y is an example embodiment that corresponds to the "first absorber end" according to the present invention. The second absorber end 140X is an example embodiment that corresponds to the "second absorber end" according to the present invention. The top sheet 110 is an example embodiment that corresponds to the "top sheet" according to the present invention. The back sheet 160 is an example embodiment that corresponds to the "back sheet" according to the present invention. The core layer 141 is an example embodiment that corresponds to the "core layer" according to the present invention. The core layer top surface 141A is an example embodiment that corresponds to the "core layer top surface" according to the present invention. The core layer back surface 141B is an example embodiment that corresponds to the "core layer back surface" according to the present invention. The core layer side surface 141C is an example embodiment that corresponds to the "core layer side surface" according to the present invention. The first covering sheet 143A is an example embodiment that corresponds to the "first covering sheet" according to the present invention. The first covering sheet top surface 143AA is an example embodiment that corresponds to the "first covering sheet top surface" according to the present invention. The first covering sheet back surface 143AB is an example embodiment that corresponds to the "first covering sheet back surface" according to the present invention. The second covering sheet 143B is an example embodiment that corresponds to the "second covering sheet" according to the present invention. The intermediate sheet 120 is an example embodiment that corresponds to the "intermediate sheet" according to the present invention. The intermediate sheet top surface 120A is an example embodiment that corresponds to the "intermediate sheet top surface" according to the present invention. The intermediate sheet back surface 120B is an example embodiment that corresponds to the "intermediate sheet back surface" according to the present invention. The composite nonwoven fabric 120 is an example embodiment that corresponds to the "composite nonwoven fabric" according to the present invention. The first to eleventh colored part 201, 202, 203, 204, 205, 206, 207, 208, 209, 210 and 211 are example embodiments that correspond to the "first colored part", the "second colored part", the "third colored part", the "fourth colored part", the "fifth colored part", the "sixth colored part", the "seventh colored part", the "eighth colored part", the "ninth colored part", the "tenth colored part" and the "eleventh colored part", respectively, according to the present invention. The first colored sheet 301 is an example embodiment that corresponds to the "first colored sheet" according to the present invention. The first colored sheet top surface 301A is an example embodiment that corresponds to the "first colored sheet top surface" according to the present invention. The first colored sheet back surface 301B is an example embodiment that corresponds to the "first colored sheet back surface" according to the present invention. The second colored sheet 302 is an example embodiment that corresponds to the "second colored sheet" according to the present invention. The second colored sheet top surface 302A is an example embodiment that corresponds to the "second colored sheet top surface" according to the present invention. The second colored sheet back surface 302B is an example embodiment that corresponds to the "second colored sheet back surface" according to the present invention. The third colored sheet 303 is an example embodiment that corresponds to the "third colored sheet" according to the present invention. The third colored sheet top surface 303A is an example embodiment that corresponds to the "third colored sheet top surface" according to the present invention. The third colored sheet back surface 303B is an example embodiment that corresponds to the "third colored sheet back surface" according to the present invention. The fourth colored sheet 304 is an example embodiment that corresponds to the "fourth colored sheet" according to the present invention. One first covering sheet 143A1 is an example embodiment that corresponds to the "one first covering sheet" according to the present invention. The other first covering sheet 143A2 is an example embodiment that corresponds to "the other first covering sheet" according to the present invention.

In view of the nature of the above-described invention, various features can be provided as follows.

(Aspect 1)

An absorbent sheet for pets, comprising:

an excretion surface on which a pet excretes, a placing surface opposite to the excretion surface, a body outer edge that forms an outer edge of the absorbent sheet, an outward direction from an inner side of the absorbent sheet toward the body outer edge, an inward direction from the body outer edge toward the inside of the absorbent sheet, an absorber, an absorber outer edge that forms an outer edge of the absorber, an absorber outer edge region that includes the absorber outer edge, an absorber central region that is formed inward of the absorber outer edge region in the inward direction, and a coloration region that is visible from the excretion surface side, wherein:

the coloration region has a first coloration region, a second coloration region and a third coloration region, and a coloration pattern is formed by the first coloration region, the second coloration region and the third coloration region.

(Aspect 2)

The absorbent sheet as defined in aspect 1, wherein the first coloration region is provided as an excrement visual recognition region for making it easy to visually recognize excrement of pets.

(Aspect 3)

The absorbent sheet as defined in aspect 2, wherein the first coloration region has an L* value larger than 80 in an L*a*b* color system.

(Aspect 4)

The absorbent sheet as defined in any one of aspects 1 to 3, wherein the third coloration region is provided as an excrement concealing region for making it hard to visually recognize excrement of pets.

(Aspect 5)

The absorbent sheet as defined in aspect 4, wherein the third coloration region has an L* value of 50 or less in the L*a*b* color system.

(Aspect 6)

The absorbent sheet as defined in aspect 4, wherein the third coloration region has an L* value larger than 0 but smaller than 100 and a b* value larger than −0.4 a in the L*a*b* color system.

(Aspect 7)

The absorbent sheet as defined in any one of aspects 1 to 6, wherein the first coloration region is formed in an outer region of the absorbent sheet in the outward direction, the second coloration region is formed inward of the first coloration region in the inward direction, and the third coloration region is formed inward of the second coloration region in the inward direction.

(Aspect 8)

The absorbent sheet as defined in any one of aspects 1 to 7, wherein the first coloration region is formed in the absorber outer edge region.

(Aspect 9)

The absorbent sheet as defined in any one of aspects 1 to 8, wherein the third coloration region is formed in the absorber central region.

(Aspect 10)

The absorbent sheet as defined in any one of aspects 1 to 9, wherein the absorbent sheet has a longitudinal direction passing through an arbitrary point on the absorbent sheet and a transverse direction crossing the longitudinal direction, and the absorber has a first absorber end in the longitudinal direction and a second absorber end in the transverse direction.

(Aspect 11)

The absorbent sheet as defined in any one of aspects 1 to 10, wherein the first coloration region is formed in the first absorber end.

(Aspect 12)

The absorbent sheet as defined in any one of aspects 1 to 10, wherein the first coloration region is formed in the second absorber end.

(Aspect 13)

The absorbent sheet as defined in any one of aspects 1 to 10, wherein the first coloration region is formed in the first absorber end and the second absorber end.

(Aspect 14)

The absorbent sheet as defined in any one of aspects 1 to 13, comprising:

a liquid-permeable top sheet that is disposed on the excretion surface side, a liquid-impermeable back sheet that is disposed on the placing surface side, a core layer that is provided in the absorber and has a core layer top surface formed on a side of the core layer facing the excretion surface, a core layer back surface formed on a side of the core layer facing the placing surface, and a core layer side surface between the core layer top surface and the core layer back surface, a first covering sheet that covers at least part of the core layer top surface and has a first covering sheet top surface formed on a side of the first covering sheet facing the excretion surface and a first covering sheet back surface formed on a side of the first covering sheet facing the placing surface, a second covering sheet that covers at least part of the core layer back surface, and an intermediate sheet that is disposed between the top sheet and the absorber and has an intermediate sheet top surface formed on a side of the intermediate sheet facing the excretion surface and an intermediate sheet back surface formed on a side of the intermediate sheet facing the placing surface.

(Aspect 15)

The absorbent sheet as defined in any one of aspects 1 to 14, wherein the intermediate sheet has a higher fiber density than the top sheet.

(Aspect 16)

The absorbent sheet as defined in any one of aspects 1 to 15, wherein the top sheet comprises a through-air nonwoven fabric.

(Aspect 17)

The absorbent sheet as defined in any one of aspects 1 to 16, wherein the intermediate sheet comprises a composite nonwoven fabric having a meltblown nonwoven fabric layer between two spun-bond nonwoven fabric layers.

(Aspect 18)

The absorbent sheet as defined in any one of aspects 1 to 17, wherein:

the intermediate sheet top surface has a smaller area than the core layer top surface, the first covering sheet has a first colored part that is different in coloration from other regions of the absorbent sheet, the first covering sheet top surface has a smaller area than the intermediate sheet top surface, the second covering sheet is formed to cover the core layer back surface, the core layer side surface and part of the core layer top surface, the first coloration region comprises the second covering sheet, the second coloration region comprises the first covering sheet, the second covering sheet and the intermediate sheet, and the third coloration region comprises the intermediate sheet and the first covering sheet.

(Aspect 19)

The absorbent sheet as defined in any one of aspects 1 to 17, comprising:

a first colored sheet that has a second colored part which is different in coloration from other regions of the absorbent sheet, and a third colored part which is different in coloration from other regions of the absorbent sheet and the second colored part, wherein:

the first colored sheet has a first colored sheet top surface formed on a side of the first colored sheet facing the excretion surface, and a first colored sheet back surface formed on a side of the first colored sheet facing the placing surface, the first colored sheet top surface has a smaller area than the core layer top surface, the first coloration region comprises a region in which the first colored sheet is not disposed on the core layer top surface, the second coloration region comprises the second colored part, and the third coloration region comprises the third colored part.

(Aspect 20)

The absorbent sheet as defined in aspect 19, wherein the first colored sheet is the first covering sheet.

(Aspect 21)

The absorbent sheet as defined in aspect 19, wherein the first colored sheet is the intermediate sheet.

(Aspect 22)

The absorbent sheet as defined in any one of aspects 1 to 17, comprising:

a second colored sheet that has a fourth colored part which is different in coloration from other regions of the absorbent sheet, and a third colored sheet that has a fifth colored part which is different in coloration from other regions of the absorbent sheet and the fourth colored part, wherein:

the second colored sheet has a second colored sheet top surface formed on a side of the second colored sheet facing the excretion surface and a second colored sheet back surface formed on a side of the second colored sheet facing the placing surface, the third colored sheet has a third colored sheet top surface formed on a side of the third colored sheet facing the excretion surface and a third colored sheet back surface formed on a side of the third colored sheet facing the placing surface, the second colored sheet top surface has a smaller area than the core layer top surface, the third colored sheet top surface has a smaller area than the second colored sheet top surface, the third colored sheet is disposed on the excretion surface side of the second colored sheet top surface, the first coloration region comprises a region in which the second colored sheet and the third colored sheet are not disposed on the core layer top surface, the second coloration region comprises the fourth colored part, and the third coloration region comprises the fifth colored part.

(Aspect 23)

The absorbent sheet as defined in aspect 22, wherein the first covering sheet comprises one first covering sheet and the other first covering sheet, the one first covering sheet is the second colored sheet, and the other first covering sheet is the third colored sheet.

(Aspect 24)

The absorbent sheet as defined in aspect 22, wherein the intermediate sheet comprises one intermediate sheet and the other intermediate sheet, one intermediate sheet is the second colored sheet, and the other intermediate sheet is the third colored sheet.

(Aspect 25)

The absorbent sheet as defined in aspect 22, wherein the first covering sheet is the second colored sheet and the intermediate sheet is the third colored sheet.

(Aspect 26)

The absorbent sheet as defined in any one of aspects 1 to 17, comprising:

a fourth colored sheet that has a sixth colored part, a seventh colored part which is different in coloration from the sixth colored part, and an eighth colored part which is different in coloration from the sixth colored part and the seventh colored part, wherein:

the first coloration region comprises the sixth colored part, the second coloration region comprises the seventh colored part, and the third coloration region comprises the eighth colored part.

(Aspect 27)

The absorbent sheet as defined in aspect 26, wherein the fourth colored sheet is not colored in the sixth colored part.

(Aspect 28)

The absorbent sheet as defined in aspect 26 or 27, wherein the fourth colored sheet is the top sheet.

(Aspect 29)

The absorbent sheet as defined in aspect 26 or 27, wherein the fourth colored sheet is the intermediate sheet.

(Aspect 30)

The absorbent sheet as defined in aspect 26 or 27, wherein the fourth colored sheet is the first covering sheet.

(Aspect 31)

The absorbent sheet as defined in any one of aspects 1 to 17, wherein:

the core layer has a ninth colored part, a tenth colored part that is different in coloration from the ninth colored part, and an eleventh colored part that is different in coloration from the ninth colored part and the tenth colored part, the first coloration region comprises the ninth colored part, the second coloration region comprises the tenth colored part, and the third coloration region comprises the eleventh colored part.

(Aspect 32)

The absorbent sheet as defined in aspect 31, wherein the ninth colored part is not colored.

DESCRIPTION OF THE NUMERALS

100, 101, 102, 103, 104, 105, 106, 107, 108, 109, 110, 1100
pet absorbent sheet (absorbent sheet for pets)
100A body outer edge
100Z1 excretion surface
100Z2 placing surface
110 top sheet
111 ridge
112 groove
113 opening
120 intermediate sheet (composite nonwoven fabric)
130 coloration region
130A first coloration region
130B second coloration region
130C third coloration region
140 absorber
140A absorber outer edge
140B absorber outer edge region
140C absorber central region
140Y second absorber end
140X first absorber end
141 core layer
141A core layer top surface 141B core layer back surface
141C core layer side surface
142 super absorbent polymer
143 covering sheet
143A first covering sheet
143AA first covering sheet top surface
143AB first covering sheet back surface
143A1 one first covering sheet
143B second covering sheet
143BA second covering sheet top surface
143BB second covering sheet back surface
143B 1 the other second covering sheet
150 bonding part
151 surface layer side bonding part
152 intermediate bonding part
153 absorber side bonding part
154 edge end bonding part
160 back sheet
201 first colored part
202 second colored part
203 third colored part
204 fourth colored part
205 fifth colored part
206 sixth colored part
207 seventh colored part
208 eighth colored part
209 ninth colored part
210 tenth colored part
211 eleventh colored part
301 first colored sheet
301A first colored sheet top surface
301B first colored sheet back surface
302 second colored sheet
302A second colored sheet top surface
302B second colored sheet back surface
303 third colored sheet
303A third colored sheet top surface
303B third colored sheet back surface
304 fourth colored sheet
D1 outward direction
D2 inward direction
Y longitudinal direction
X transverse direction

The invention claimed is:

1. An absorbent sheet for pets comprising:
an excretion surface on which a pet excretes,
a placing surface opposite to the excretion surface,
a body outer edge that forms an outer edge of the absorbent sheet,
an outward direction from an inner side of the absorbent sheet toward the body outer edge,
an inward direction from the body outer edge toward the inside of the absorbent sheet,
an absorber,
an absorber outer edge that forms an outer edge of the absorber,
an absorber outer edge region that includes the absorber outer edge,
an absorber central region that is formed inward of the absorber outer edge region in the inward direction, and
a coloration region that is visible from the excretion surface side,
a liquid-impermeable back sheet that is disposed on the placing surface side,
a core layer that is provided in the absorber and has a core layer top surface formed on a side of the core layer facing the excretion surface, a core layer back surface formed on a side of the core layer facing the placing surface, and a core layer side surface between the core layer top surface and the core layer back surface,
a first covering sheet that covers at least part of the core layer top surface and has a first covering sheet top surface formed on a side of the first covering sheet facing the excretion surface and a first covering sheet back surface formed on a side of the first covering sheet facing the placing surface,
a second covering sheet that covers at least part of the core layer back surface,
the second covering sheet is formed to cover the core layer back surface, the core layer side surface and part of the core layer top surface,
the first covering sheet has an L* value of 50 or less in the L*a*b* color system and
the second covering sheet has an L* value larger than 80 in an L*a*b* color system,
wherein:
the coloration region has a first coloration region formed in the absorber outer edge region, a second coloration region and a third coloration region, wherein the second coloration region has a visually different appearance than the first coloration region, and the third coloration region has a visually different appearance than the first and second coloration regions,
a coloration pattern is formed by the first coloration region, the second coloration region and the third coloration region formed in the absorber central region,
the first coloration region comprises the second covering sheet,
the second coloration region comprises the first covering sheet and the second covering sheet,
the third coloration region comprises the first covering sheet,
the first covering sheet has a first colored part that is different in coloration from other regions of the absorbent sheet,
the first covering sheet top surface has a smaller area than the intermediate sheet top surface,
the second covering sheet is formed to cover the core layer back surface, the core layer side surface and part of the core layer top surface,
the first coloration region comprises the second covering sheet,
the second coloration region comprises the first covering sheet, the second covering sheet and the intermediate sheet, and
the third coloration region comprises the intermediate sheet and the first covering sheet,
the absorbent sheet for pets further comprising:
an intermediate sheet that is disposed between a top sheet and the absorber and has an intermediate sheet top surface formed on a side of the intermediate sheet facing the excretion surface and an intermediate sheet back surface formed on a side of the intermediate sheet facing the placing surface, wherein the intermediate sheet top surface has a smaller area than the core layer top surface.

2. The absorbent sheet as defined in claim 1, wherein the first coloration region is formed in an outer region of the absorbent sheet in the outward direction, the second coloration region is formed inward of the first coloration region in the inward direction, and the third coloration region is formed inward of the second coloration region in the inward direction.

3. The absorbent sheet as defined in claim 2, wherein the first coloration region is formed in the absorber outer edge region.

4. The absorbent sheet as defined in claim 2, wherein the third coloration region is formed in the absorber central region.

5. The absorbent sheet as defined in claim 1, wherein the absorbent sheet has a longitudinal direction and a transverse direction crossing the longitudinal direction, and the absorber has a first absorber end in the longitudinal direction and a second absorber end in the transverse direction.

6. The absorbent sheet as defined in claim 5, wherein the first coloration region is formed in the first absorber end.

7. The absorbent sheet as defined in claim 5, wherein the first coloration region is formed in the second absorber end.

8. The absorbent sheet as defined in claim 5, wherein the first coloration region is formed in the first absorber end and the second absorber end.

9. The absorbent sheet as defined in claim 1, wherein the intermediate sheet has a higher fiber density than the top sheet.

10. The absorbent sheet as defined in claim 1, wherein the top sheet comprises a through-air nonwoven fabric.

11. The absorbent sheet as defined in claim 10, wherein the top sheet comprises ridges, grooves which are each formed between adjacent ones of the ridges, and openings which are formed at intervals and extend along the grooves.

12. The absorbent sheet as defined in claim 1, wherein the intermediate sheet comprises a composite nonwoven fabric having a meltblown nonwoven fabric layer between two spun-bond nonwoven fabric layers.

13. The absorbent sheet as defined in claim 1, wherein the first covering sheet is formed of tissue paper.

14. The absorbent sheet as defined in claim 1, wherein the second covering sheet is formed of tissue paper.

* * * * *